United States Patent
Limas et al.

(10) Patent No.: US 11,637,801 B1
(45) Date of Patent: Apr. 25, 2023

(54) CLIENT IDENTIFICATION AND MANAGEMENT ACROSS MULTIPLE SOCIAL PLATFORMS

(71) Applicant: UIPCO, LLC, San Antonio, TX (US)

(72) Inventors: Shanna Ruth Limas, San Antonio, TX (US); Natalya Lohinova Jeffords, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/916,923

(22) Filed: Jun. 30, 2020

(51) Int. Cl.
*H04L 51/52* (2022.01)
*H04L 51/56* (2022.01)
*H04L 51/046* (2022.01)
*H04L 9/40* (2022.01)
*H04L 9/32* (2006.01)

(52) U.S. Cl.
CPC .............. *H04L 51/52* (2022.05); *H04L 9/32* (2013.01); *H04L 9/3271* (2013.01); *H04L 51/046* (2013.01); *H04L 51/56* (2022.05); *H04L 63/0414* (2013.01); *H04L 63/08* (2013.01); *H04L 63/0876* (2013.01); *H04L 63/12* (2013.01)

(58) Field of Classification Search
None
See application file for complete search history.

(56) References Cited

U.S. PATENT DOCUMENTS

| | | |
|---|---|---|
| 11,120,409 B1 * | 9/2021 | Worth ................. G06Q 10/1095 |
| 2003/0093690 A1 * | 5/2003 | Kemper .................. G06F 21/31 726/5 |
| 2008/0255992 A1 * | 10/2008 | Lin ......................... G06Q 40/02 705/44 |
| 2015/0088593 A1 * | 3/2015 | Raghunathan ......... G06Q 50/01 705/7.27 |
| 2018/0232750 A1 * | 8/2018 | Spencer ................. G06Q 50/01 |
| 2018/0255045 A1 * | 9/2018 | Cicchitto ............ H04L 63/0815 |

* cited by examiner

*Primary Examiner* — Lance Leonard Barry
(74) *Attorney, Agent, or Firm* — Perkins Coie LLP

(57) ABSTRACT

The present embodiments relate to identifying a user on an external platform as a client of an entity and managing interactions with the user. An input provided by the user on an external platform can be parsed to derive user-specific social media data for the user. The user-specific social media data can be compared with client information maintained in a client database and a harvested social media database to identify the user as a client. A verification message can be sent to the user via a messaging application of the external platform to receive semi-private client data and verify the identity of the user. A response can be generated for the user based on client information. The response to the user can include a link to a secure messaging application to enable secure data communication between the user and the client.

18 Claims, 6 Drawing Sheets

CLIENT IDENTIFICATION AND MANAGEMENT ACROSS MULTIPLE SOCIAL PLATFORMS

TECHNICAL FIELD

This disclosure is directed generally to data management, and more particularly, to identification of clients and managing client interactions across disparate platforms.

BACKGROUND

Social media platforms are gaining popularity as a technique for interaction between individuals. An individual can create an account on a social media platform and interact with others and post content for others to engage with. Further, an individual may create accounts across various social media platforms to access varying features across the social media platforms. In generation of each account, the individual may provide information (e.g., a social media handle, an email address, a phone number) that differs across each social media platform.

Entities may maintain social accounts on various social media platforms to interact with individuals and post content relating to the entity and products/services provided by the entity. One action that individuals can take on social media platforms is to interact with the entity. For instance, an individual can post an inquiry to the entity on a social account associated with the entity. In response, the entity can respond to the individual on the social media platform to provide the requested information.

Figure 1:
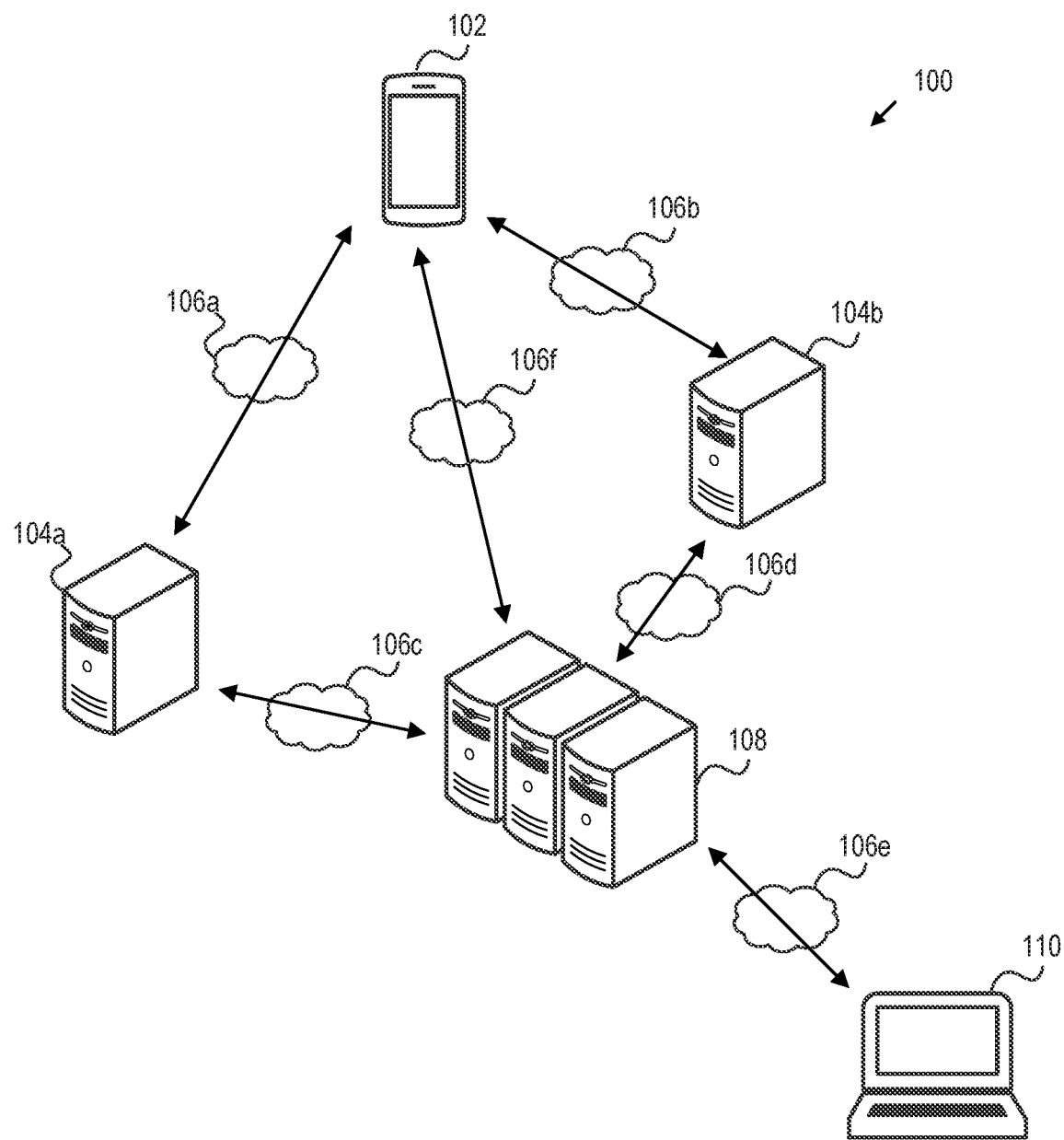
FIG. 1 is a block diagram of an example environment in which the present embodiments are implemented.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Users may interact with one or more social media platforms for various reasons, such as interact with other users on the social media platforms or post content to be viewed by other users, for example. Further, a user may have an account across multiple disparate social media platforms.

In many cases, entities (e.g., service providers) also have accounts on various social media platforms. The entities can present content and interact with users on the social media platforms. For example, an entity can respond to questions provided by a user via a messaging interface on the social media platform.

The entity may determine whether a user interacting with the entity on a social media platform is a client of the entity. Determining whether a user is a client of the entity can allow for retrieval of client information to increase accuracy in responses provided by the entity.

However, identifying an identity of a user engaging with the entity on a social media platform can be difficult. For instance, a username (or simply "handle") of a user may not be indicative of a legal name of the user or a provided name (e.g., "John Smith") of the user may be common to multiple clients of the entity. In such instances, the entity may be unable to determine whether the user is a client of the entity.

One method to verify an identity of a user is to request the user to provide entity-specific credentials on the social media platform. This can include providing a user identifier (e.g., government-provided identifier, client number, account number, financial information, passwords) on a messaging application of the social media platform. However, messaging application security procedures across social media platforms may vary and may leave private user information vulnerable to unauthorized access.

Further, if a user is identified as a client on a first social media platform using semi-private client data, the client may subsequently interact with the entity on a second social media platform. However, the user may include differing information (e.g., usernames, handles, semi-private data (email address, phone number)) between different social media platforms. Accordingly, even after identifying a client on a first social media platform, the system may fail to identify the same client on another social media platform.

In some instances, to identify whether a user on a social media platform is a client, the entity may request for the client to provide client-identifying information. However, if the user engages with the entity on different social media platforms, the entity may repeatedly request the client-identifying information for each social media platform, which can reduce computational-efficiency and/or computer network efficiency.

System Overview

The present embodiments relate to dynamically determining whether a user of an application is a client of an entity and managing interactions with users across disparate external platforms. The system as described herein can obtain user information (e.g., a social media handle) and identify potential clients based on the user information in multiple databases (e.g., a social handle harvesting database and/or a confirmed handle database). The system can confirm an identify of a user as a client by requesting semi-private data over a messaging application on a platform. The system can perform data harvesting to retrieve information relating to the client and platform-specific information (e.g., a social media handle, semi-private information for the client) to update client identifying information across multiple platforms.

The present embodiments allow for identification of clients across various platforms. For instance, for a client engaging with an entity using user accounts across multiple social media platforms, the present embodiments can utilize client-specific information to identify the client across the social media platforms. Rather than repeatedly perform requests for client for each of multiple social media platforms, the present embodiments can confirm an identity of the client by retrieving social media information across the social media platforms and use public client data or semi-private client data to verify the identity of the client. Further, the present embodiments can minimize manual tasks performed by individuals associated with the entity to identify users across social media platforms by automatically identifying the client when the operator selects a client profile in the system. Client identification can be performed independently across social platforms.

As an illustrative example, a user can present an inquiry to the entity via a first social media application. The user account can include user-specific information (e.g., a social media handle "John Smith") that may differ across user accounts for different social media applications. In some instances, the entity may include a portal that allows for engagement with users across multiple social media applications. In some embodiments, the system can use the social handle to identify a client and harvest semi-private data that can be used to further verify the identity of the client.

The entity may be unable to initially determine whether the user is a client of the entity. For instance, the entity can process client information databases to determine that the social media handle "John Smith" could correspond to one of a plurality of clients of the entity. The system can request information identifying the client (e.g., a phone number, email address, a client-specific phrase/code) via a messaging application specific to the first social media application. In response to obtaining a response from the user, the system can compare the obtained information with known client information to verify an identity of the client.

Responsive to verifying the identity of the client, the system can retrieve client information and generate a response to the inquiry that uses the client information. In some instances, if the system determines that the interaction between the entity and the client includes sensitive/confidential information, the entity can provide a link to redirect the client to a secure messaging application.

The system can perform social media data harvesting for the client data to retrieve client-specific social media data (e.g., social media handle, associated email address, phone number) and maintain the retrieved client-specific social media data in relevant databases. The system can maintain client-specific social media data across various social media applications for the client to identify the client across the social media applications. For example, if the client provides a second inquiry to the entity via the social media application, the system can retrieve the client-specific social media data and identify the client based on the harvested client-specific social media data.

In the present embodiments, social media platforms are used as illustrative examples for implementing processes as described here. However, the present embodiments are not limited to such examples. For example, any applications/webpages/platforms that allow for communication between an entity and a user can utilize the present embodiments. Additionally, as used herein, a member can be a customer of an entity.

Example Environment Overview

FIG. 1 is a block diagram of an example environment 100 in which the present embodiments are implemented. As shown in FIG. 1, the environment 100 can include a user device 102 comprising a device associated with a user. User device 102 can include a network-accessible device (e.g., smart phone, computer, tablet, wearable device) capable of communicating data with other devices (e.g., social media platform servers 104a-b). For instance, the user device 102 can execute a webpage/application (e.g., a social media application) on the user device 102. As described in greater detail below, the user device 102 can allow for a user to interact with various social media platforms, provide user account information, interact with an entity, etc.

The environment 100 can include social media platform servers 104a-b. Social media platform servers 104a-b can include computing devices (e.g., server, series of interconnected servers) associated with social media platforms. For instance, the social media platform servers 104a-b can allow a user access to a user account of social media platforms and provide social media platform application pages to the user device 102.

In some embodiments, the user device 102 can interact with multiple disparate social media platforms via servers 104a, 104b. For instance, a first social media platform may be executed via server 104a and a second social media platform may be executed via server 104b. The user, via user device 102, may log into and interact with the different social media platforms via servers 104a-b. Further, in many cases, the user accounts for each social media may include different information. For example, a social media handle of the user on a first social media platform may differ from a social media handle of the user on the second social media platform. As another example, semi-private information (e.g., a phone number, email address) of the user can differ between social media platforms.

Devices in the environment 100 can communicate via networks 106a-f. Network(s) 106a-f can include suitable wired/wireless interfaces allowing for data communication between devices. The network(s) 106a-f can include personal area networks (PANs), local area networks (LANs), wide area networks (WANs), metropolitan area networks (MANs), cellular networks, the Internet, etc.

The environment 100 can include a network-accessible server system 108. Network-accessible server system 108 can include one or more interconnected computing devices (e.g., server) capable of maintaining data and performing processing tasks as described herein. In some embodiments, the network-accessible server system 108 can provide entity-specific application/webpage information as described herein.

The environment 100 can include an operator device 110. The operator device 110 can include a device (e.g., a computer) associated with an operator (e.g., an administrator of the entity network or an employee of the entity). For instance, the operator, via operator device 110, can interact with the user via social media platforms.

Figure 2:
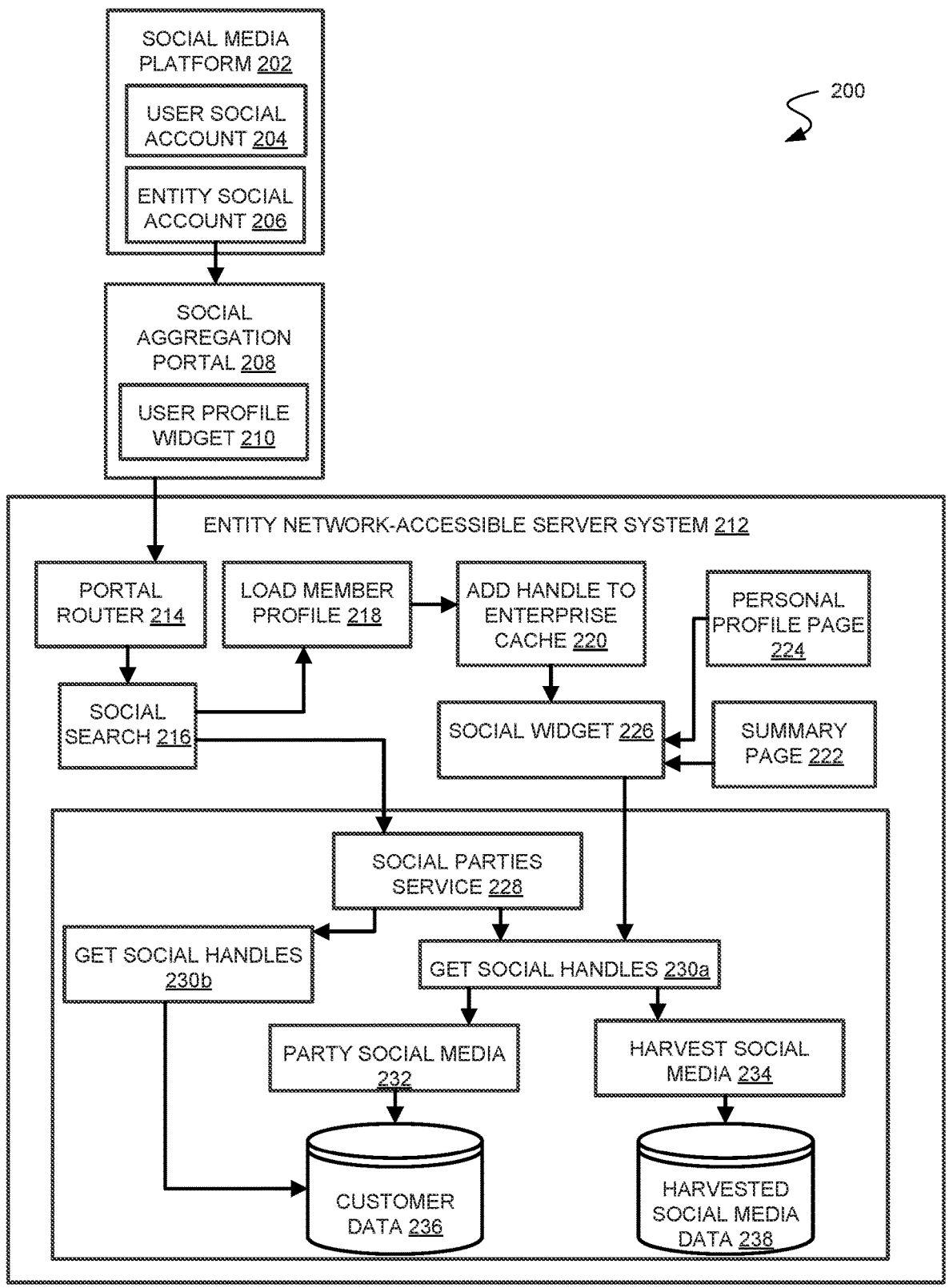
FIG. 2 is a block diagram of an example flow process for identifying a user as a client and managing interactions with the client.

FIG. 2 is a block diagram 200 of an example flow process for identifying a user as a client and managing interactions with the client. As shown in FIG. 2, a social media platform 202 can include a user social account 204 and an entity social account 206. The social media platform 202 can maintain a plurality of accounts for users that identify the users and allow for interaction between connected users. For example, the user social account 204 can include a set of user-specific data (e.g., social media handle, phone number, email address) to identify the user when interacting with other users in the social media platform 202. Similarly, the entity social account 206 can include entity-specific information that allows for other users to interact with and obtain information relating to the entity. Any of the user and entity can present (or "post") content to other users on social media platform 202.

The entity can interact with social media platform(s) using a social aggregation portal 208. The social aggregation portal 208 can allow for the entity to interact with social media platforms and users on various platforms. For instance, the social aggregation portal can allow for identification of user interactions with entity social accounts (e.g., entity social account 206) on various social media platforms.

The social aggregation portal 208 can include a user profile widget 210. A user profile widget 210 can retrieve and provide client information to increase accuracy in interactions between a user and the entity on a social media platform. For instance, if the user provides an inquiry about interest rates, the user profile widget 210 can retrieve client information after identifying the client and process the client information to derive a range of potential interest rates for the client.

The entity network-accessible server system 212 can include a platform associated with the entity that can allow for interaction with the social aggregation portal. Entity network-accessible server system 212 can include network-accessible server system 108 as described with respect to FIG. 1. The entity network-accessible server system 212 can implement a portal router 214. The portal router 214 can obtain social media platform data (e.g., an inquiry provided by a user on a first social media platform) and direct the social media platform data to social search 216.

Social search 216 can process the social media platform data to determine whether the user interacting with the entity is identified as a client. This can include detecting an identifier associated with the social media handle or username on the social media platform. For instance, if an identifier is associated with the social media handle of the user, the social search 216 can determine that the client can be identified by the social media handle. The social search 216 can forward the social media platform data to any of a load member profile process 218 or a social parties service process 228.

The load member profile process 218 can allow for selection of a client of the entity and retrieval of information specific to the client. The load member profile process 218 can include processing information in the social media platform data to identify the client. For instance, the load member profile process 218 can parse the social media handle included in social media platform data to identify a name of a client of the entity and select the client. The client-identifying information and the social media platform data can be forwarded to an add handle to enterprise cache 220 process. The add handle to enterprise cache 220 process can include adding the social media handle indicative of the client to enterprise cache. This can allow for the system to identify the client based on the stored social media handle.

The entity network-accessible server system 212 can include a personal profile page 224 that can allow for retrieval and access to social media handles across various social media platforms. The entity network-accessible server system 212 can also include a summary page 222 that can provide a summary of social handles for a client across the various social media platforms.

The handle added to enterprise cache, information included in the personal profile page, and/or information in the summary page can be provided to a social widget 226. The social widget 226 can include a widget that allows for access of various social handles, platforms, dates added, a status of the client and inquiries provided by the client, etc.

In some instances, the social search 216 can present social media platform data to the social parties service 228. The social search 216 can request a client number using a social media handle lookup responsive to being unable to identify the client from a social media handle associated with the client. The social search 216 can utilize various architectures to define parameters/constraints for creating/processing on web services, such as Representational State Transfer (REST), for example.

The social parties service 228 can forward a client number (e.g., member number) search using the social media handle to a get social handles process 230b. The get social handles process 230a, 230b can include retrieving various social media handles for the client across various social media platforms. For instance, get social handles process 230b can retrieve social media handles for a client and a client number from customer data 236.

In some instances, the social widget 226 can forward the social media platform data and added social media handle to a get social handles process 230a. The get social handles process 230a can parse the social media platform data and added social media handle to identify customer data and other social media data. The customer data can be forwarded to a party social media process 232 and the social media data can be forwarded to a harvest social media process 234. The party social media process 232 can arrange and store client data in customer data 236. The harvest social media 234 can process and arrange social media data and store the data in a harvested social media data 238.

Figure 3:
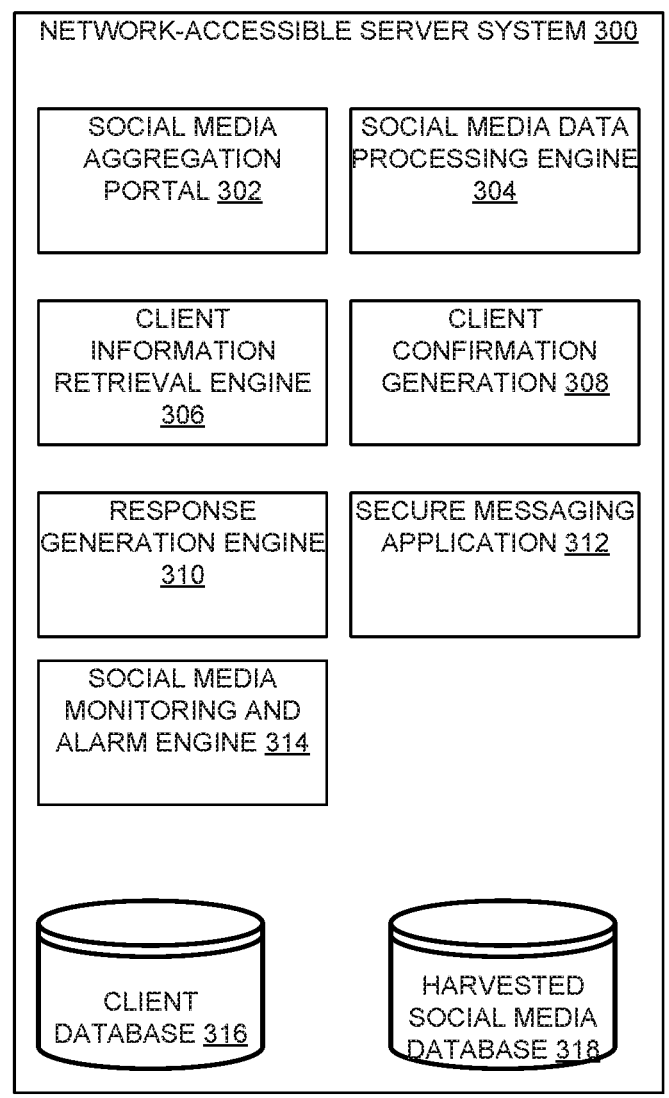
FIG. 3 is an example block diagram of a network-accessible server system.

FIG. 3 is an example block diagram of a network-accessible server system 300. The network-accessible server system 300 (or simply "system") as described herein can include any of the features of network-accessible server system 108 as discussed with respect to FIG. 1 and/or entity network-accessible server system 212 as discussed with respect to FIG. 2, for example.

As shown in FIG. 3, the network-accessible server system 300 can include a social media aggregation portal 302. The social media aggregation portal 302 can include a portal that can link entity-associated accounts across multiple social media platforms. For instance, the social media aggregation portal 302 can aggregate all inquiries/interactions with users on various social media platforms and prepare the inquiries for response (e.g., by response generation engine 310). The social media aggregation portal 302 can retrieve and arrange user-specific information, such as the inquiry by the user, a social media handle of the user, previous posts by the user, other platform-specific user data (e.g., email address, phone number, passcode, challenge question), etc.

A social media data processing engine 304 can process the inquiry provided by the user arranged by the social media aggregation portal 302 to derive various insights into the inquiry. The social media data processing engine 304 can determine whether the user is a client of the entity by inspecting the user-specific social media handle and determining whether the handle corresponds with a client. This can include comparing the social media handle against entries in a client database 316 and/or a harvested social media database 318 to determine whether the social media handle is associated with a client. In some cases, an indicator can be associated with the social media handle that can identify the client.

In some embodiments, comparing a social media handle with information included in a client database 316 can identify a number of potential clients that could correspond to the user that has the social media handle. As an example, if the handle is for "John Smith," and the client database 316 identifies five clients with the name "John Smith," the system may be unable to properly identify the client based on the handle. In such an instance, the system may attempt to identify which potential client is the user with the social media handle. In response, the system can request semi-private client information (e.g., an email address, a phone number) via a messaging application on the social media platform that the inquiry was received. The received semi-private client information can be compared with the client from the number of potential clients.

A client information retrieval engine 306 can obtain client identifying information (e.g., a client number, a social media handle that identifies a client, etc., and retrieve this information from a client database 316. This can include retrieving information relating to products provided to the client, client-specific information, client account information, etc. the client information can be utilized in performance of subsequent tasks, such as generating a response to the client or harvesting social media data, as described in detail herein.

A client confirmation generation module 308 can generate a client confirmation message to be sent to the user on a specific social media platform to verify/confirm an identity of the client. For instance, the client confirmation generation module can identify semi-private client information that can verify an identity of a client and generate a request to the user requesting the semi-private client information. For example, this can include sending a request for an email address of the user to confirm that the user is a client. The system can obtain a response from the user via the messaging application on the social media platform, and, in some cases, forwarded by social media aggregation portal 302, to client confirmation generation module 308. The response can include the semi-private client information and the system can verify the identity of the client based on this response. In some instances, the client confirmation generation module 308 can selectively identify a type of semi-private information to request from the user based on a security of the messaging application on the social media platform, identifying information included in a listing of potential clients, a derived confidence in a potential client, etc.

A response generation engine 310 can process client information of the identified client and the inquiry provided on a social media platform to generate a response that includes information unique to the client. For instance, if the inquiry relates to a product the client has with an entity, the entity can process client information to provide a response that is specific to the client. The generated response can be provided to the client via a messaging application on the social media platform.

In some instances, the client may send multiple messages to the entity over the social media platform. The system can continue to process received messages and dynamically provide responses that are specific to the client. The system can also process each received message to determine whether the messages include sensitive client information. For example, if a message includes a request for sensitive information or includes such information (e.g., account numbers, personally identifying information, financial information), the system may update a next response to the client by providing a link to a secure messaging application 312. The secure messaging application 312 can allow for secure communication on an entity-maintained device. The client may be required to provide identifying information (e.g., a username and password) to access and communicate on the secure messaging application 312. The secure messaging application 312 may allow for secure communication rather that communicating over messaging applications of social media platforms that may include varying ranges of data security.

A social media monitoring and alarm engine 314 can monitor content on social media platforms and entity accounts on the social media platforms and perform tasks based on monitored content. For instance, the social media monitoring and alarm engine 314 can monitor social media post content to search for specific terms relating to the entity. As an example, if the social media monitoring and alarm engine 314 determines a threshold number of instances of social media posts that include the name of the entity and the word "down," the social media monitoring and alarm engine 314 can determine that the entity servers may be down for users.

The social media monitoring and alarm engine 314 can process terms posted on social media platforms or on entity accounts to determine whether a threshold number of instances of a term are identified. The social media monitoring and alarm engine 314 can take subsequent actions based on determining that a threshold number of instances of a term are identified. For example, the system can set an alarm to inspect/fix a specific server/tool responsive to identifying that users are indicating that the server/tool is down or unresponsive. As another example, the system can set an alarm if the entity is unresponsive or untimely in providing various information over social media platforms.

As shown in FIG. 3, the network-accessible server system 300 can include any of a client database 316 and a harvested social media database 318. The client database 316 can include information relating to a client of the entity. For instance, client information can include products provided to the client, personal information for the client, etc. The client information can be utilized in generating responses to inquiries to the client via a social media platform and/or the secure messaging application 312.

The harvested social media database 318 can include social media data gathered for a user on a social media platform. For instance, responsive to a user on a social media platform providing an inquiry to the entity, the social media aggregation portal 302 can parse social media data (e.g., social media handle, posts by the user, semi-private information) relating to the user, arrange the data by data type, and store the data in the harvested social media database 318. The harvested social media data in database 318 can be utilized in identifying a user as a client of the entity by comparing received social media data with stored harvested social media data to identify the client.

In some embodiments, the system may not identify a user on a social media platform as a client of the entity. In many cases, the user may not be a client of the entity and may simply be requesting more information relating to the entity. In response to failing to identify the user as a client, the system can generate a response to the user that responds to the inquiry by the user. Further, the system can provide links to the user to an entity-maintained webpage to provide more detailed information about products offered by the entity or for the user to become a client of the entity. If the user becomes a client of the entity, the newly-added client information can be added to client database 316.

Client Identification Overview

Figure 4:
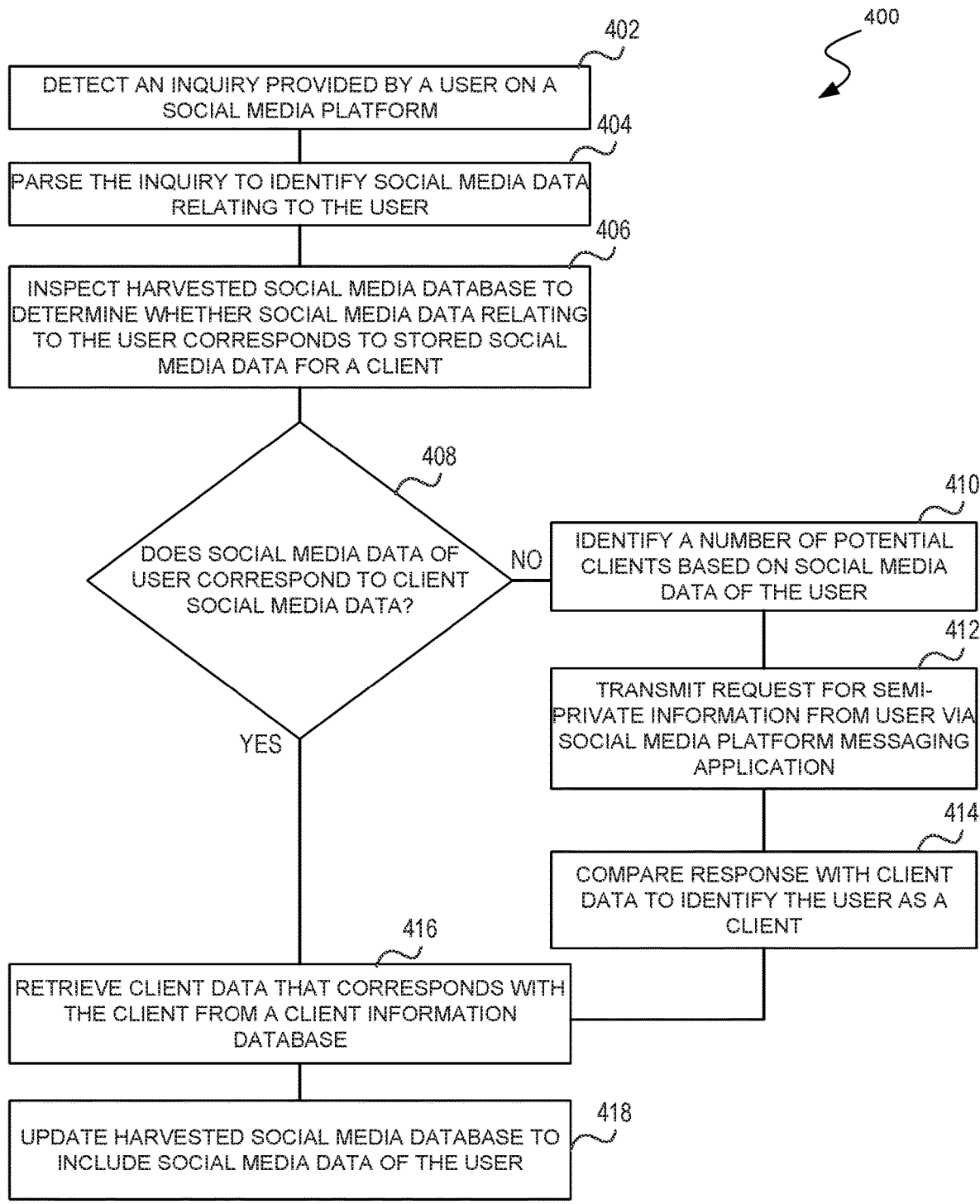
FIG. 4 is an example flow process for identifying a user on a social media platform as a client.

FIG. 4 is an example flow process 400 for identifying a user on a social media platform as a client. As noted above, the system as described herein can process an inquiry provided by a user on a first social media platform to identify the identity of the client based on social media data of the user. This can allow for identifying the client across various social media platforms and providing client-specific information to the client.

The system can include detecting an inquiry provided by a user on a social media platform (block 402). The inquiry can include any of a post or a direct message provided to an entity account on a social media platform. The system can aggregate user inquiries via a social media aggregation portal. The inquiry can include information relating to the user (e.g., a social media handle, contact information) and a request for more information relating to a specific topic.

The system can parse the inquiry to identify social media data relating to the user (block 404). This can include identifying a portion of the data comprising the inquiry, a social media handle of the user, semi-private user information (e.g., phone number, email address), previous posts by the user, etc. The parsed social media data can be stored in a harvested social media database.

The system can inspect the harvested social media database to determine whether the social media data relating to the user corresponds to stored social media data for a client (block 406). This can include comparing user social media data (e.g., a social media handle) with previously-identified social media data of a client of the entity.

The system can determine whether the social media data of the user corresponds to the client social media data (decision block 408). For example, information from a client database and a social media database can be retrieved and processed to identify any social media handles that match or are similar to the retrieved social media handle of the user. This can include identifying a social media handle that corresponds with a client or identifying multiple potential clients that could comprise the user, for example.

Responsive to determining that the social media data of the user does not correspond to any client social media data relating to client, the system can identify a number of potential clients based on the social media data of the user (block 410). This can be indicative that the user can comprise a client of the entity, but the system may be unable to immediately identify a client based on social media data associated with a user on a social media platform. Accordingly, the system can identify a number of potential clients that could comprise the user on the social media platform.

For example, the system can identify a number of clients that include names or previously-stored social media handles that have a threshold similarity to the social media handle of the user. A threshold similarity can include a number of common similar characters/words/phrases between the social media handle and information relating to the client. For example, if a user social media handle is "John Smith," the system can identify five clients with the name "John Smith." The system, in response, may prepare a request for more information from the user to identify the user as a client.

The system can transmit a request for semi-private information from the user via a social media platform messaging application (block 412). This can include a request for user-specific information (e.g., a phone number, email address, passcode, challenge question) provided to the user over a messaging application specific to the social media platform. In response, the system can receive a response from the user that includes the requested semi-private data. The response can be obtained via an entity-specific social media account and processed via a social media aggregation portal.

The system can compare a response provided by the user with client data to identify the user as a client (block 414). For example, if the response includes a phone number of the user, the system can compare the phone number with phone numbers associated with the number of potential clients to identify a client that includes the phone number of the user. The system can verify/match the user to a client profile based on identifying semi-private information that matches that of a client profile.

Responsive to determining that the social media data of the user does not correspond to the client social media data and/or identifying the user as a client, the system can retrieve client data that corresponds with the client from a client information database (block 416). This can include inspecting a client database and/or a harvested social media database to retrieve data relating to the client. The retrieved client data can be utilized in subsequent tasks, such as generating a response to the client on the social media platform or updating the client profile to include new social media data, for example.

The system can update harvested social media database to include social media data of the user (block 418). Updating client data to include the social media data (e.g., social media handle, phone number, email address) of a client on a social media platform can allow for the system to identify the user as a client in subsequent instances where the client provides an inquiry to the entity on the social media platform. The client data/harvested social media data maintained for a client can include information across multiple social media platforms to identify the client across the multiple social media platforms.

Response Generation and Secure Response Transmission Overview

Figure 5:
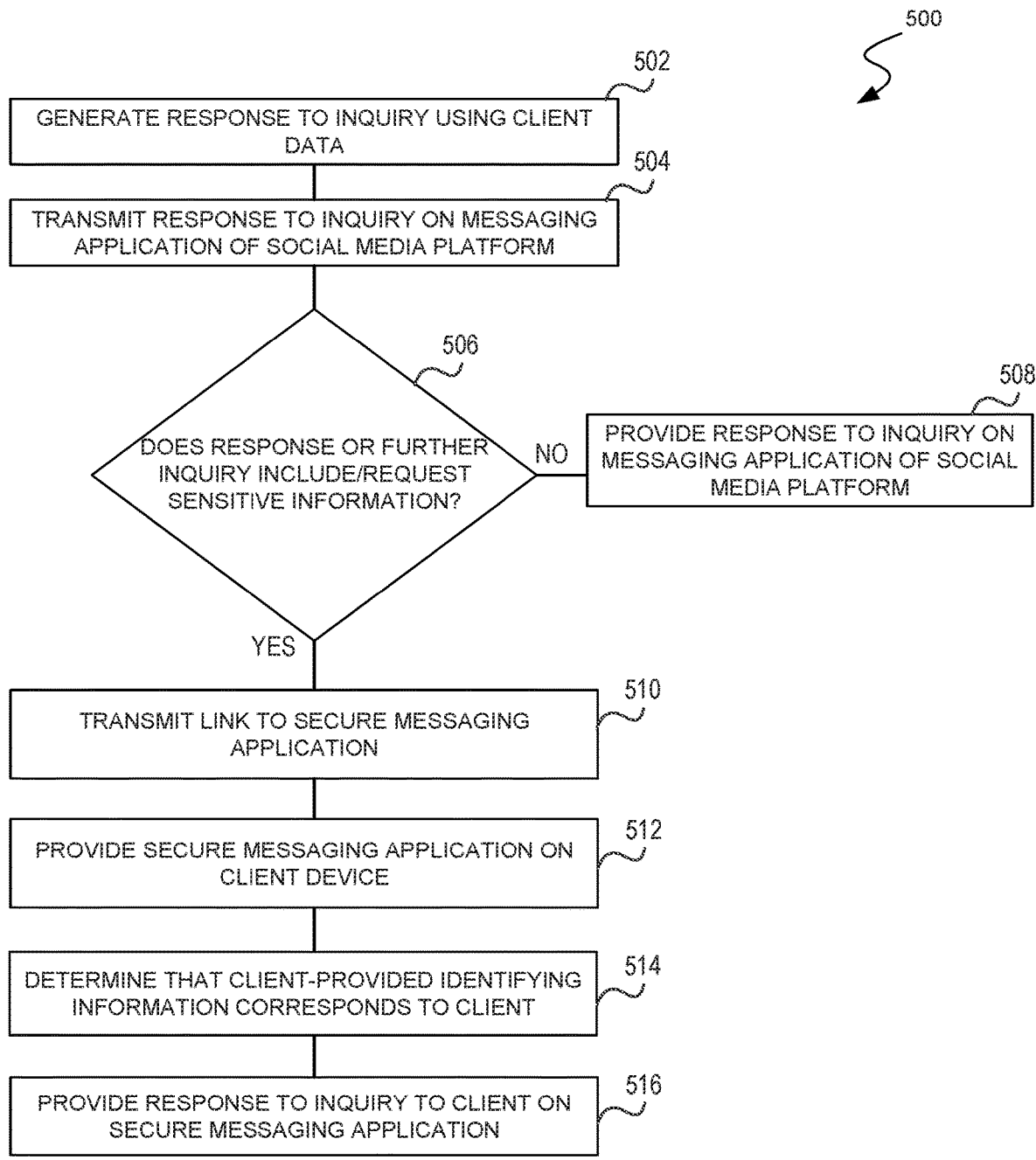
FIG. 5 is an example flow process for generating responses to a client and performing subsequent actions.

FIG. 5 is an example flow process 500 for generating responses to a client and performing subsequent actions. As noted above, the system can determine an identity of the user as a client. The system can utilize client information to perform subsequent actions, such as provide a response to the client on a social media platform and/or a secure messaging application maintained by the system.

The system can generate a response to an inquiry provide by the user using client data (block 502). This can include processing the inquiry and client data to derive a client-specific response to the client. For example, if the inquiry is requesting more information relating to a product, the response can include the requested information as well as an indication of whether the product would be available to the client or a recommendation of a product for the client.

The system can transmit a response to the inquiry on a messaging application of the social media platform (block 504). The response can be sent over a messaging application specific to the social media platform and the response can be routed to the user using a social media aggregation portal. However, messaging applications may differ across social media platforms and may include varying levels of security in data transmission. This may result in some messaging applications leaving data exposed to unauthorized access. Accordingly, the system can redirect inquiries/responses to/from a client to a secure messaging application to increase data security.

The system can process an inquiry/response to determine whether the inquiry/response includes or requests sensitive information (decision block 506). This can include parsing text included in an inquiry/response to identify whether sensitive information (e.g., client identifiers, financial information) is included or requested in the inquiry/response.

Responsive to determining that the inquiry/response does not include or request sensitive data, the system can provide a response to the inquiry on the messaging application of the social media platform (block 508). The system can provide a series of messages to the client on the messaging application of the social media platform that does not include sensitive data. For instance, the system can respond to the inquiry to provide hours of operation of the entity or a phone number to call the entity.

Responsive to determining that the inquiry/response does include or request sensitive data, the system can transmit a link to the secure messaging application (block 510). This can include a link to a webpage/application page to redirect the client device to a secure messaging application maintained by the entity. This can allow for secure information transmission between the client and entity. For instance, if the client inquiry is "what is my account number" for a product, the response can be provided to the client on the secure messaging application to prevent unauthorized access to the account number.

The system can provide the secure messaging application on the client device (block 512). In some instances, to operate the secure messaging application, the client may provide client-specific identifying information, such as a username/password, for example.

The system can determine that the client-provided identifying information corresponds to the client (block 514). This can include comparing the client-provided identifying information with client information stored in a client database to verify an identity of the client with a high-level match. The client device and entity device can then establish a secure data flow to securely transmit data over the secure messaging application.

The system can provide a response to the inquiry to the client on the secure messaging application (block 516). The secure messaging application can secure/encrypt/obscure the response to the client via a suitable technique.

In some embodiments, the system can monitor social media content (e.g., posts by users, messages sent to an entity account) across social media platforms and take subsequent actions based on the monitored actions. For instance, if a threshold number of instances of a word (e.g., "down" "broken") is detected relating to an entity, the system can send an alert to an operator requesting the operator to inspect/remedy and issues with a device/tool.

As an illustrative embodiment, a method to identify a user of an external platform as a client of an entity and manage interactions with the user is provided. The method can include obtaining an input from a user device associated with a user via a first external platform. The input can include an inquiry directed to the entity (e.g., via a direct message to the entity social account or posted directly to the entity social account page). "External" as used herein means managed, existing or controlled outside of the entity and that facilitates communications between users and the entity. For example, the entity can be a service provider such as a telephone company or an insurance provider that is communicating with a user (e.g., customer or potential customer) and an external platform can be a social media application.

In some embodiments, the method can include aggregating a series of inputs provided by multiple users on multiple external platforms using an external platform aggregation portal. The external platform aggregation portal can arrange inputs provided by various users across multiple external platforms (e.g., social media platforms).

The method can also include parsing the input to identify user-specific external platform data and input information relating to the input. This can include identifying a username/social media handle of the user, user account information (e.g., email address, previous posts by the user), etc. The input information can include the text providing the inquiry and the input can be processed to derive keywords/terms that provide the inquiry to the entity.

The method can also include comparing the user-specific external platform data with information included in a client information database and information included in an external platform information database to identify a first client that includes information of a threshold similarity to the user-specific external platform data. This can include identifying a profile of a client of the entity that potentially can comprise the identity of the user. However, in many cases, the entity may verify the identity of the user as the first client by requesting client-specific information (e.g., phone number, email address, passcode) of the first client.

In some embodiments, the client information database includes information specific to each of multiple clients, and wherein the external platform information database includes client-specific social media data relating to multiple clients obtained from user-specific external platform data included in inputs from multiple external platforms.

The method can also include transmitting a verification message to the user device via a first messaging application of the first external platform. The verification message can include a request for client-specific information. The method can also include receiving a verification response message from the user device via the first messaging application of the first external platform that includes the requested client-specific information.

The method can also include comparing the client-specific information with data relating to the first client included in the client information database and the external platform information database to determine whether the client-specific information corresponds with the data relating to the first client to verify that an identity of the user matches that of the first client. For example, the received client-specific information can include a phone number of the client, and the system can compare the received phone number with phone numbers in a client database to identify the first client with a matching phone number. This can verify the identity of the user as the first client.

In some embodiments, the method can include inspecting the user-specific external platform data to identify a username of the user that is specific to the first external platform. The method can also include detecting an indicator associated with the identified username of the user that is specific to the first external platform as corresponding to the first client. The method can also include mapping the indicator to the data relating to the first client included in the client information database and the external platform information database, wherein the identity of the user is verified as the identity of the first client based on mapping the indicator to the data relating to the first client.

In some embodiments, the method can include identifying a number of potential clients that include information within the threshold similarity to the user-specific external platform data, the first client included in the number of potential clients. The method can also include detecting a client-specific information data type that is common among each of the number of potential clients, wherein the verification message to the user device includes the request for client-specific information of the client-specific information data type. The method can also include, responsive to receiving the verification response message from the user device, identifying the first client of the number of potential clients by matching the received client-specific information to information relating to the first client.

The method can also include, responsive to determining that the identity of the user matches that of the first client, generating a response to the input provided by the user using the data relating to the first client. The response can be generated using parsed keywords in the input and using the data relating to the first client. For instance, if the input is a request for information relating to a product provided by the entity, the entity can provide a response that includes the requested information as well as other client-specific information, such as whether the client is approved for the product, for example.

The method can also include transmitting the generated response to the user device. This generated response can be provided over the first messaging application of the first external platform or a secure messaging application.

In some embodiments, the method can include determining that any of the input information and the generated response to the input includes or requests information indicative of the identity of the first client. The method can also include, responsive to determining that any of the input information and the generated response to the input includes or requests information indicative of the identity of the first client, transmitting a link to the user device to redirect the user device to a secure messaging application, wherein the generated response is transmitted to the user device via the secure messaging application.

In some embodiments, the method can include, responsive to determining that the client-specific information corresponds with the data relating to the first client to verify that the identity of the user matches that of the first client, updating the external platform information database to correlate the user-specific external platform data and client-specific information with the first client.

In some embodiments, the method can include monitoring a plurality of content on multiple external platforms to retrieve a number of instances of a plurality of keywords associated with an entity. The method can also include determining that a number of instances of a first keyword exceeds a threshold number. The method can also include responsive to determining that the number of instances of the first keyword exceeds the threshold number, generating an alert relating to the first keyword.

Example Device Implementation Overview

Figure 6:
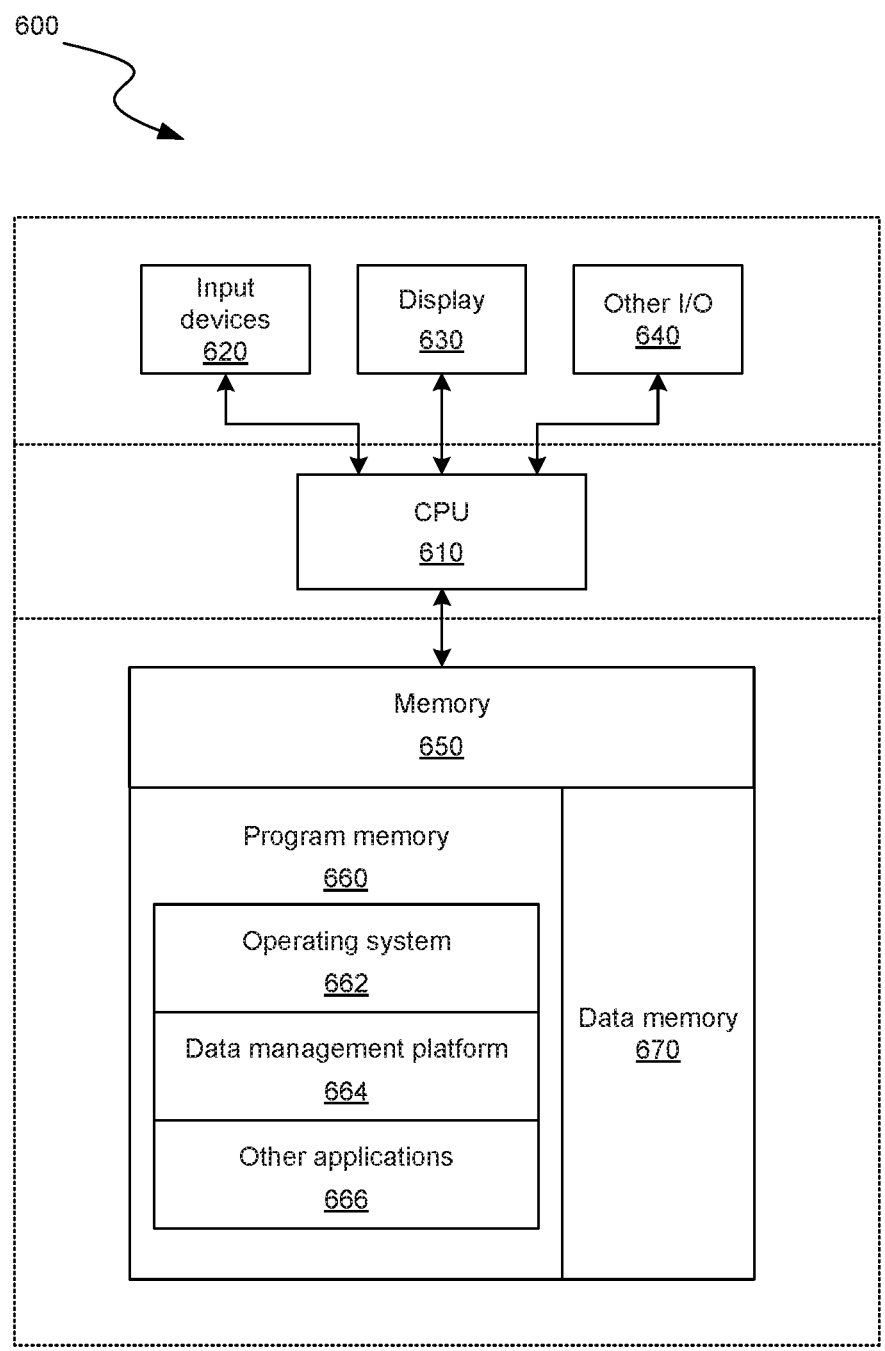
FIG. 6 is a block diagram illustrating an overview of devices on which some implementations of the present embodiments can operate.

FIG. 6 is a block diagram illustrating an overview of devices on which some implementations of the present embodiments can operate. The devices can comprise hardware components of a device 600, such as a client device or network-accessible server system as described herein.

Device 600 can include one or more input devices 620 that provide input to the central processing unit (CPU) 610 (e.g., processor), notifying it of actions. The actions are typically mediated by a hardware controller that interprets the signals received from the input device and communicates the information to the CPU 610 using a communication protocol. Input devices 620 include, for example, a mouse, a keyboard, a touchscreen, an infrared sensor, a touchpad, a wearable input device, a camera- or image-based input device, a microphone, or other user input devices.

CPU 610 can be a single processing unit or multiple processing units in a device or distributed across multiple devices. CPU 610 can be coupled to other hardware devices, for example, with the use of a bus, such as a peripheral component interconnect (PCI) bus or small computer system interface (SCSI) bus. The CPU 610 can communicate with a hardware controller for devices, such as for a display 630. Display 630 can be used to display text and graphics. In some examples, display 630 provides graphical and textual visual feedback to a person operating the device 600. In some implementations, display 630 includes the input device as part of the display, such as when the input device is a touchscreen or is equipped with an eye direction monitoring system. In some implementations, the display is separate from the input device. Examples of display devices are: a liquid crystal display (LCD) display screen; a light-emitting diode (LED) display screen; a projected, holographic, or augmented reality display (such as a heads-up display device or a head-mounted device); and so on. Other I/O devices 640 can also be coupled to the processor, such as a network card, video card, audio card, USB, FireWire or other external device, camera, printer, speakers, CD-read-only memory (ROM) drive, DVD drive, disk drive, or Blu-Ray device.

In some implementations, the device 600 also includes a communication device capable of communicating wirelessly or wire-based with a network node (e.g., a server) or with a user device (e.g., a laptop, desktop, or mobile device) or with one or more computers (e.g., desktop or laptop) associated with the customer service representatives. The communication device can communicate with another device or a server through a network using, for example, TCP/IP protocols. Device 600 can utilize the communication device to distribute operations across multiple network devices.

The CPU 610 can have access to a memory 650. A memory can include one or more of various hardware devices for volatile and non-volatile storage and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 650 can include program memory 660 that stores programs and software. Memory 650 can also include data memory 670 that can include various information as described in this patent document, which can be provided to the program memory 660 or any element of the device 600. The program memory 660 can include a data management platform 664 and other applications 666 capable of performing the processing tasks as described herein.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, portable electronic devices such as smartphones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

In an example embodiment, the above-described methods are embodied in the form of processor-executable code and stored in a computer-readable program medium. Thus, a non-transitory machine-readable medium having machine executable instructions stored thereon that, when executed by one or more processors, direct the one or more processors to perform a method described in the present Figures and/or in the various embodiments described in this patent document.

Those skilled in the art will appreciate that the components illustrated in FIGS. 1-6 described above, and in each of the flow diagrams, may be altered in a variety of ways. For example, the order of the logic may be rearranged, sub-steps may be performed in parallel, illustrated logic may be omitted, other logic may be included, etc. In some implementations, one or more of the components described above can execute one or more of the processes described above.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U. S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A computer-implemented method comprising:
   obtaining an input from a user device associated with a user via a first external platform;

parsing the input to identify user-specific external platform data and input information relating to the input;
comparing the user-specific external platform data with information included in a client information database and information included in an external platform information database to identify a first client that includes information of a threshold similarity to the user-specific external platform data;
transmitting a verification message to the user device via a first messaging application of the first external platform, the verification message including a request for client-specific information;
receiving a verification response message from the user device via the first messaging application of the first external platform that includes the client-specific information;
comparing the client-specific information with data relating to the first client included in the client information database and the external platform information database to determine whether the client-specific information corresponds with the data relating to the first client to verify that an identity of the user matches that of the first client;
in response to determining that the identity of the user matches that of the first client, generating a response to the input provided by the user using the data relating to the first client;
determining that any of the input information and the generated response to the input includes or requests information indicative of the identity of the first client;
in response to determining that any of the input information and the generated response to the input includes or requests information indicative of the identity of the first client, transmitting a link to the user device to redirect the user device to a secure messaging application; and
transmitting the generated response to the user device via the secure messaging application.

2. The computer-implemented method of claim 1, further comprising:
aggregating a series of inputs provided by multiple users on multiple external platforms using an external platform aggregation portal.

3. The computer-implemented method of claim 1, further comprising:
inspecting the user-specific external platform data to identify a username of the user that is specific to the first external platform;
detecting an indicator associated with the identified username of the user that is specific to the first external platform as corresponding to the first client; and
mapping the indicator to the data relating to the first client included in the client information database and the external platform information database, wherein the identity of the user is verified as the identity of the first client based on mapping the indicator to the data relating to the first client.

4. The computer-implemented method of claim 1, further comprising:
identifying a number of potential clients that include information within the threshold similarity to the user-specific external platform data, the first client included in the number of potential clients;
detecting a client-specific information data type that is common among each of the number of potential clients, wherein the verification message to the user device includes the request for the client-specific information of the client-specific information data type; and
in response to receiving the verification response message from the user device, identifying the first client of the number of potential clients by matching the client-specific information to information relating to the first client.

5. The computer-implemented method of claim 1, wherein the client information database includes information specific to each of multiple clients, and wherein the external platform information database includes client-specific social media data relating to multiple clients obtained from user-specific external platform data included in inputs from multiple external platforms.

6. The computer-implemented method of claim 1, further comprising:
in response to determining that the client-specific information corresponds with the data relating to the first client to verify that the identity of the user matches that of the first client, updating the external platform information database to correlate the user-specific external platform data and client-specific information with the first client.

7. The computer-implemented method of claim 1, further comprising:
monitoring a plurality of content on multiple external platforms to retrieve a number of instances of a plurality of keywords associated with an entity;
determining that a number of instances of a first keyword exceeds a threshold number; and
in response to determining that the number of instances of the first keyword exceeds the threshold number, generating an alert relating to the first keyword.

8. A system to identify a user of an external platform as a client of an entity, the system comprising:
a user device associated with the user, the user device configured to:
present a user-specific display of a first external platform on the user device; and
provide an input directed to the entity on the first external platform, the input including user-specific external platform data and input information relating to an inquiry provided in the input; and
a network-accessible server system associated with the entity, the network-accessible server system configured to:
parse the input to identify the user-specific external platform data and the input information in the input;
compare the user-specific external platform data with information included in a client information database and information included in an external platform information database to identify a first client that includes information of a threshold similarity to the user-specific external platform data;
transmit a verification message to the user device via a first messaging application of the first external platform, the verification message including a request for client-specific information;
receive a verification response message from the user device via the first messaging application of the first external platform that includes the client-specific information;
verify an identity of the user as the first client by matching the client-specific information with data relating to the first client included in the client information database and the external platform information database;

update the external platform information database to correlate the user-specific external platform data and client-specific information with the first client
generate a response to the input provided by the user using the data relating to the first client;
determine that any of the input information and the generated response to the input includes or requests information indicative of the identity of the first client;
in response to determining that any of the input information and the generated response to the input includes or requests information indicative of the identity of the first client, transmit a link to the user device to redirect the user device to a secure messaging application; and
transmit the generated response to the user device via the secure messaging application.

9. The system of claim 8, wherein the network-accessible server system is further configured to:
aggregate a series of inputs provided by multiple users on multiple external platforms using an external platform aggregation portal.

10. The system of claim 8, wherein the network-accessible server system is further configured to:
inspect the user-specific external platform data to identify a username of the user that is specific to the first external platform;
detect an indicator associated with the identified username of the user that is specific to the first external platform as corresponding to the first client; and
map the indicator to the data relating to the first client included in the client information database and the external platform information database, wherein the identity of the user is verified as the identity of the first client based on mapping the indicator to the data relating to the first client.

11. The system of claim 8, wherein the network-accessible server system is further configured to:
identify a number of potential clients that include information within the threshold similarity to the user-specific external platform data, the first client included in the number of potential clients;
detect a client-specific information data type that is common among each of the number of potential clients, wherein the verification message to the user device includes the request for the client-specific information of the client-specific information data type; and
in response to receiving the verification response message from the user device, identify the first client of the number of potential clients by matching the client-specific information to information relating to the first client.

12. The system of claim 8, wherein the client-specific information includes any of a telephone number and an email address associated with the client.

13. The system of claim 8, wherein the input provided by the user device is provided to an entity-specific account on the first external platform either directly to the entity-specific account or via the first messaging application of the first external platform, the first external platform including a social media application.

14. A non-transitory machine-readable medium having machine executable instructions stored thereon that, when executed by one or more processors, direct the one or more processors to perform a method comprising:
obtaining an input from a user device associated with a user via a first external platform;
parsing the input to identify user-specific external platform data and input information relating to the input;
comparing the user-specific external platform data with information included in a client information database and information included in an external platform information database to identify a first client that includes information of a threshold similarity to the user-specific external platform data;
obtaining verification information from the user device via a first messaging application of the first external platform;
comparing the verification information with data relating to the first client included in the client information database and the external platform information database to determine whether the verification information corresponds with the data relating to the first client to verify that an identity of the user matches that of the first client;
in response to determining that the identity of the user matches that of the first client, generating a response to the input provided by the user using the data relating to the first client;
determining that any of the input information and the generated response to the input includes or requests information indicative of the identity of the first client;
in response to determining that any of the input information and the generated response to the input includes or requests information indicative of the identity of the first client, transmitting a link to the user device to redirect the user device to a secure messaging application; and
transmitting the generated response to the user device via the messaging application.

15. The non-transitory machine-readable medium of claim 14, further comprising:
aggregating a series of inputs provided by multiple users on multiple external platforms using an external platform aggregation portal.

16. The non-transitory machine-readable medium of claim 14, further comprising:
inspecting the user-specific external platform data to identify a username of the user that is specific to the first external platform;
detecting an indicator associated with the identified username of the user that is specific to the first external platform as corresponding to the first client; and
mapping the indicator to the data relating to the first client included in the client information database and the external platform information database, wherein the identity of the user is verified as the identity of the first client based on mapping the indicator to the data relating to the first client.

17. The non-transitory machine-readable medium of claim 14, further comprising:
identifying a number of potential clients that include information within the threshold similarity to the user-specific external platform data, the first client included in the number of potential clients;
detecting a client-specific information data type that is common among each of the number of potential clients, wherein the verification information is of the client-specific information data type; and
identifying the first client of the number of potential clients by matching the verification information to information relating to the first client.

18. The non-transitory machine-readable medium of claim 14, further comprising:

in response to determining that the verification information corresponds with the data relating to the first client to verify that the identity of the user matches that of the first client, updating the external platform information database to correlate the user-specific external platform data and verification information with the first client;

monitoring a plurality of content on multiple external platforms to retrieve a number of instances of a plurality of keywords associated with an entity;

determining that a number of instances of a first keyword exceeds a threshold number; and in response to determining that the number of instances of the first keyword exceeds the threshold number, generating an alert relating to the first keyword.

\* \* \* \* \*